United States Patent [19]

Sellstedt

[11] 3,915,961
[45] Oct. 28, 1975

[54] 5-ARYL-1H-1,4-BENZODIAZEPINE-2(3H)-ONE-3-PHOSPHONIC ACIDS, DERIVATIVES AND PROCESSES FOR THEIR USE

[75] Inventor: John H. Sellstedt, Pottstown, Pa.

[73] Assignee: American Home Products Corporation, New York, N.Y.

[22] Filed: Apr. 18, 1974

[21] Appl. No.: 462,004

Related U.S. Application Data

[63] Continuation-in-part of Ser. No. 317,342, Dec. 21, 1972, abandoned.

[52] U.S. Cl................ 260/239.3 D; 424/244
[51] Int. Cl.$^2$.............. C07D 243/24; C07D 243/26
[58] Field of Search.......................... 260/239.3 D

*Primary Examiner*—Henry R. Jiles
*Assistant Examiner*—Robert T. Bond
*Attorney, Agent, or Firm*—Royal E. Bright

[57] ABSTRACT

Novel 5-aryl-1H-1,4-benzodiazepine-2(3H)-one-3-phosphonic acids and their lower alkyl and phenyl(lower)alkyl esters which are CNS depressants, and processes for their use in preparing other 3-substituted benzodiazepines.

3 Claims, 1 Drawing Figure

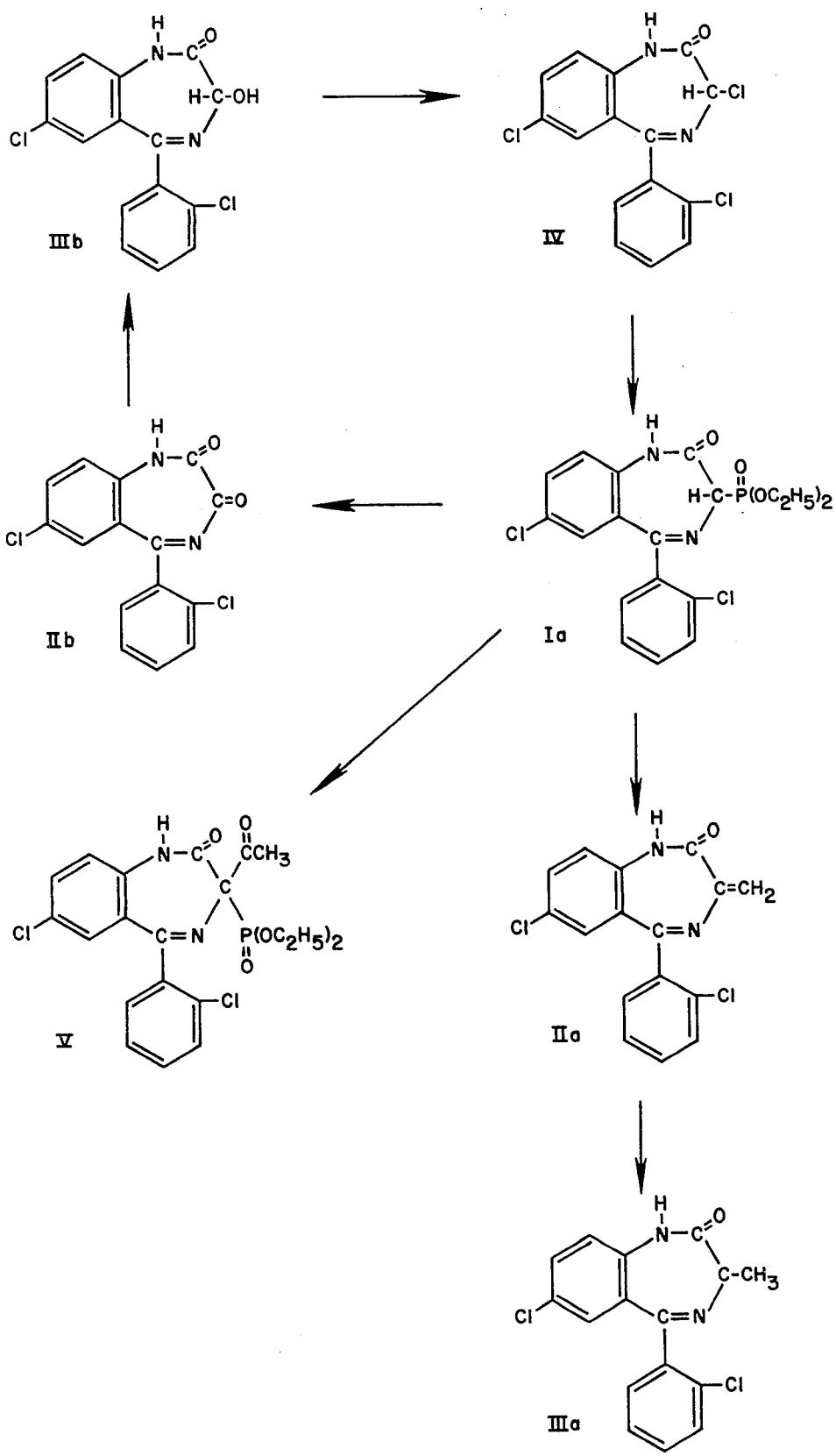

5-ARYL-1H-1,4-BENZODIAZEPINE-2(3H)-ONE-3-PHOSPHONIC ACIDS, DERIVATIVES AND PROCESSES FOR THEIR USE

CROSS-REFERENCE TO COPENDING APPLICATION

This application is a continuation-in-part of copending application Ser. No. 317,342, filed Dec. 21, 1972 now abandoned.

BACKGROUND OF THE INVENTION

This invention relates to compositions of matter classified in the art of chemistry as 5-aryl-1H-1,4-benzodiazepine-2(3H)-one-3-phosphonic acids and their lower alkyl and phenyl(lower)alkyl esters, and processes for their uses.

SUMMARY OF THE INVENTION

The invention sought to be patented, in its first composition aspect, is described as residing in the concept of a chemical compound having a structure as illustrated by Formula I:

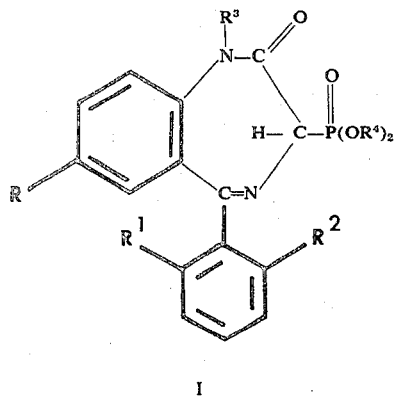

I wherein R is hydrogen, lower alkyl, halo, $-CF_3$, or lower alkyl sulfonyl; $R^1$ is hydrogen, lower alkyl, halo, or lower alkyl sulfonyl; $R^2$ is $-CF_3$, hydrogen, lower alkyl, halo, or lower alkyl sulfonyl; $R^3$ is hydrogen, or lower alkyl; and $R^4$ is hydrogen, lower alkyl or phenyl(lower)alkyl.

The tangible embodiments of the composition aspect of the invention possess the inherent general physical properties of being white crystalline solids, are substantially insoluble in non-polar hydrocarbon solvents such as hexane and are substantially soluble in polar solvents such as acetonitrile. Examination of the compounds produced by the hereinafter described process reveals, upon infrared, ultraviolet, and nuclear magnetic resonance spectrographic analysis, spectral data supporting the molecular structure herein set forth.

The tangible embodiments of the first composition aspect of the invention possess the inherent applied use characteristics of exerting central nervous system depressant effects upon administration to warm-blooded animals as evidenced by standard pharmacological test procedures, and in addition they are intermediates in the synthesis of known pharmacologically active, benzodiazepines.

The invention sought to be patented in its second composition aspect resides in the concept of a chemical compound having the structure:

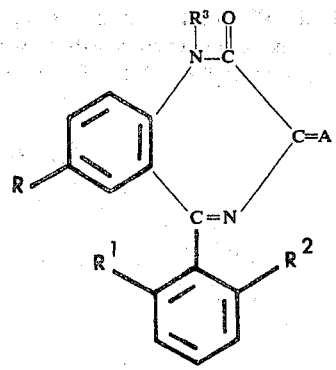

II wherein R, $R^1$, $R^2$ and $R^3$ are as described hereinabove and A is oxo or methylene.

The tangible embodiments of the second composition aspect of the invention process the inherent general physical properties of being white crystalline solids, are substantially insoluble in non-polar hydrocarbon solvents such as hexane, and are substantially soluble in such solvents as acetonitrile, and ethyl acetate.

Examination of the compounds produced by the hereinafter described process reveals upon infrared, ultraviolet and nuclear magnetic resonance spectrographic analysis, spectral data supporting the molecular structure herein set forth.

The tangible embodiments of the second composition aspect of the invention possess the inherent applied use characteristic of being intermediates in the synthesis of known, pharmacologically active, benzodiazepines.

The invention sought to be patented in its third composition aspect resides in the concept of the chemical compound:

[3-acetyl-7-chloro-5(o-chlorophenyl)-2,3-dihydro-2-oxo-1H-1,4-benzodiazepine-3-yl]phosphonic acid diethyl ester.

The tangible embodiment of the third composition aspect of the invention possesses the inherent physical properties of being a crystalline solid, of being substantially insoluble in non-polar hydrocarbon solvents such as hexane, and being soluble in such common organic solvents as ethyl acetate.

Examination of the compound produced by the hereinafter described process reveals, upon infrared analysis, spectral data supporting the molecular structure herein set forth.

The tangible embodiment of the third composition aspect of the invention possesses the inherent applied use characteristic of exerting a hypotensive effect in warm-blooded animals.

The invention sought to be patented in its process aspect resides in the concept of a process for the preparation of a chemical compound having the formula:

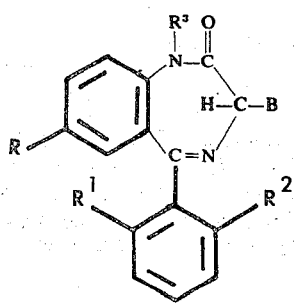

III wherein R, R¹, R², and R³ are as defined hereinabove; and B is hydroxy or methyl which comprises:

a. treating a compound of the formula:

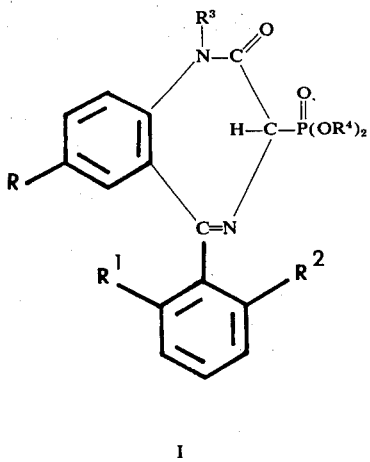

I wherein R, R¹, R², R³ and R⁴ are as described hereinabove; with a strong base, and then with oxygen or formaldehyde to produce a compound of the formula:

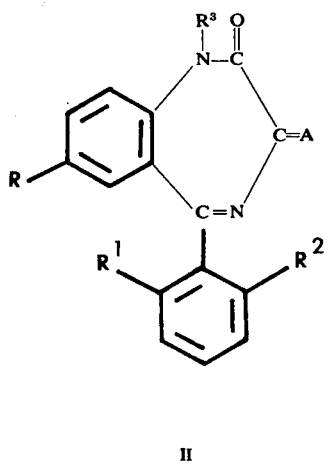

II wherein R, R¹, R², R³, and A are as defined hereinabove; and b. reducing the product of step a above.

DESCRIPTION OF THE PREFERRED EMBODIMENTS

In describing the process for the preparation of specific embodiments of the invention, reference will be made to the Figure wherein the compounds are assigned Roman numerals for identification schematically, and wherein is illustrated schematically the reaction sequence for preparing a specific embodiment of Formula I namely, diethyl 7-chloro-5-(o-chlorophenyl)-1H-1,4-benzodiazepine-2(3H)-one-3-phosphonic acid (Ia), specific embodiments of Formula II namely 7-chloro-5-(o-chlorophenyl)-1,3-dihydro-3-methylene-2H-1,4-benzodiazepine-2-one (IIa), and 7-chloro-5-(o-chlorophenyl)-1H-1,4-benzodiazepine-2,3-dione (IIb); the chemical compound [3-acetyl-7-chloro-5-(o-chlorophenyl)-2,3-dihydro-2-oxo-1H-1,4-benzodiazepin3-yl]phosphonic acid, diethyl ester (V); and the conversion of IIa and IIb into the known 7-chloro-5-(o-chlorophenyl)-3-methyl-1H-1,4-benzodiazepin-2-one (IIIa) and 7-chloro-5-(o-chlorophenyl)-3-hydroxy-1H-1,4-benzodiazepin-2-one (IIIb) respectively.

7-Chloro-5-(o-chlorophenyl)-3-hydroxy-1H-1,4-benzodiazepine-2(3H)-one (IIIb) is treated with thionyl chloride at elevated temperature, conveniently reflux temperature, for a short period of time, conveniently 1 hour, to prepare 3,7-dichloro-5-(o-chlorophenyl)-1H-1,4-benzodiazepine-2(3H)-one (IV). After treatment to remove excess thionyl chloride, compound IV is warmed with triethylphosphite, conveniently on the steam bath, for a period of from 14 to 24 hours, conveniently 18 hours, to produce diethyl-7-chloro-5-(o-chlorophenyl)-1H-1,4-benzodiazepine-2(3H)-one-3-phosphonic acid (Ia). The product is recovered by standard methods.

Treatment of Ia with strong base, conveniently sodium hydride, while in solution, conveniently in 1,2-dimethoxyethane, followed by treatment with formaldehyde, conveniently in gaseous form, gives IIa. IIa may, if desired, be isolated by standard techniques. Chromatography on silica gel is a convenient method. Reduction of IIa, conveniently by catalytic hydrogenation, gives IIIa. IIIa may, if desired, be isolated by standard techniques. Treatment of Ia, in solution, conveniently in dimethyl formamide or 1,2-dimethoxyethane, with strong base, conveniently sodium hydride, followed by treatment with oxygen gives IIb. IIb may, if desired, be isolated by standard techniques. Crystallization from solvents, such as acetonitrile, is convenient. Reduction of IIb, conveniently with sodium borohydride, gives IIIb. IIIb may, if desired, be isolated by standard techniques. If Ia, in solution, conveniently in 1,2-dimethoxyethane, is treated with strong base, conveniently sodium hydride, and then with acetyl chloride V is obtained. V may, if desired, be isolated by standard techniques. Crystallization from solvents, such as a mixture of ethyl acetate and hexane, is convenient.

While the process of the application has been described with reference to the Figure which illustrates its application to the preparation of Ia, IIa, IIb, IIIa, IIIb, and V, it will be obvious to substitute the variously substituted 5-aryl-3-hydroxy-1H-1,4-benzodiazepine-2(3H)-ones required to prepare the other compositions contemplated within the scope of the invention. Similarly the substitution of other phosphonylating agents such as tribenzylphosphite or trimethylphosphite will also be obvious. The use of strong bases other than sodium hydride, such as, for example, sodium methoxide, will be obvious to one skilled in the art. The use of other reducing agents in addition to those disclosed will also be obvious to a skilled organic chemist.

The starting materials for the practice of the invention are, in the case of the various tri(lower)alkyl phosphites and tri[phenyl(lower)alkyl]phosphites, commercially available or easily obtainable from preparations well-known in the chemical literature, and are, in the case of the 5-aryl-3-hydroxy-1H-1,4-benzodiazepine-2(3H)-ones, well-known in the literature and may be prepared by methods cited in the article, "The Chemistry of Benzodiazepines" by Giles A. Archer and Leo H. Sternbach in Chemical Reviews, Volume 68, page 747 (1968), and the references cited therein.

The central nervous system depressant activity of the tangible embodiments of the invention can be elicited by the use of pharmacological procedures well-known in the art. When administered to mice at dosage levels of 400, 127, 40, 12.7, 4.0, 1.27, 0.4, 0.217, and 0.04 mg. per kg., followed by observation over a minimum of two hours, the tangible embodiments of the invention exhibit the effect of inducing general depression of the animals as evidenced by decreased spontaneous motor activity and decreased respiration. When administered to mice the tangible embodiments of the invention exhibit these effects at a dose of from 12.7 mg. per kg. of body weight intraperitoneally to 400 mg. per kg. of body weight orally.

The hypotensive effect of the third composition aspect of the invention can be elicited by the use of pharmacological procedures well-known in the art. Rats are rendered hypotensive by applying a figure-of-8 ligature around one kidney, and contralateral nephrectomy. The blood pressure then tends to stabilize at a hypertensive level after about 6 weeks. Systolic pressure is measured. A control group is run with each group of rats treated with the drug. Each group consists of 6 rats. Blood pressures are read before administration of the compound and at 2 and 24 hours thereafter. When administered orally to rats, [3-acetyl-7-chloro-5-(o-chlorophenyl)-2,3-dihydro-2-oxo-1H-1,4-benzodiazepin-3-yl]phosphonic acid, diethylester caused a moderate decrease in blood pressure at a dose level of 100 mg. per kg. of body weight.

When the tangible embodiments of the invention are employed as central nervous system depressants or hypotensive agents they may be administered to warm-blooded animals, e.g. mice, rats, rabbits, dogs, monkeys and so forth, alone or in combination with pharmacologically acceptable carriers.

The dosage employed upon administration of the tangible embodiments of the invention will vary with the form of administration and the particular compound chosen. Furthermore, it will vary with the particular subject under treatment. Generally treatment is initiated with small dosages substantially less than the optimum dose of the compound. Thereafter the dosage is increased by small increments until the optimum effect under the circumstances is reached. In general, the tangible embodiments of the invention are most desirably administered at a concentration level that will generally afford effective results without causing any harmful or deleterious side effects.

The 3-hydroxy, and 3-lower alkyl-benzodiazepines, to which the compositions of the invention are intermediates, are well-known useful benzodiazepines and are typically illustrated by U.S. Pat. Nos. 3,296,249, and 3,247,187.

As used herein the term "lower alkyl" means a saturated hydrocarbon radical including the straight and branched chain radicals of from 1 to 6 carbon atoms, among which are for the purposes of illustration, but without limiting the generality of the foregoing, methyl, ethyl and i-butyl. The term halo means fluoro, chloro, or bromo.

The following examples further illustrate the best mode contemplated by the inventor for carrying out the process of the invention.

EXAMPLE 1

Diethyl 7-Chloro-5-(o-Chlorophenyl)-1H-1,4-Benzodiazepine-2(3H)-One-3-Phosphonic Acid 7-Chloro-5-(o-chlorophenyl)-3-hydroxy-1H-1,4-benzodiazepine-2(3H)-one (6.42 g., 0.02 mole) and 50 ml. of thionyl chloride are refluxed for 1 hour. The thionyl chloride is stripped off on a rotary evaporator at 60°, and the residue is scrubbed with 50 ml. of toluene, which is then stripped off. Triethylphosphite (45 ml.) is added and the mixture is heated on a steam bath for 18 hours under a $N_2$ atmosphere. The excess triethylphosphite is stripped off on a rotary evaporator, giving a solid. The solid is crystallized from acetonitrile, giving white crystals, 6.5 g. m.p. 172°–174°.

| Analysis for: | $C_{19}H_{19}Cl_2N_2O_4P$ |
|---|---|
| Calculated: | C, 51.71; H, 4.34; N, 6.35; Cl, 16.07 |
| Found: | C, 52.06; H, 4.35; N, 6.81; Cl, 15.93. |

EXAMPLE 2

Dimethyl 7-Chloro-5-(o-Chlorophenyl)-1H-1,4-Benzodiazepine-2(3H)-One-3-Phosphonic Acid 7-Chloro-5-(o-chlorophenyl)-3-hydroxy-1H-1,4-benzodiazepine-2(3H)-one (32.1 g., 0.1 mole) and 150 ml. of thionyl chloride are refluxed for 1 hour. The thionyl chloride is stripped off on a rotary evaporator at 60°, and the residue is scrubbed with 250 ml. of toluene, which is then stripped off. Trimethylphosphite (125 ml.) is added and the mixture is heated on the steam bath for 2 hours, refluxed for 1½ hours, and then heated on a steam bath for 18 hours under a $N_2$ atmosphere. The mixture is filtered, and the solid washed with toluene, giving 42.5 g. of white crystals, m.p. 242° dec. The solid is crystallized from 2500 ml. of acetonitrile, giving 30 g. of white crystals, m.p. 248° dec.

| Analysis for: | $C_{17}H_{15}Cl_2N_2O_4P$ |
|---|---|
| Calculated: | C, 49.42; H, 3.66; N, 6.78; Cl, 17.16 |
| Found: | C, 49.45; H, 3.76; N, 6.85; Cl, 17.17. |

EXAMPLE 3

Diethyl 7-Chloro-5(o-Chlorophenyl-1-Methyl)-1H-1,4-Benzodiazepine-2(3H)-One-3-Phosphonic Acid Following a procedure as taught in Example 1 from 7-chloro-5-(o-chlorophenyl)-3-hydroxy-1-methyl-1H-1,4-benzodiazepine-2(3H)-one, treated with thionylchloride and then triethyl phosphite, is obtained the title product.

EXAMPLE 4

7-Chloro-5-(o-Chlorophenyl)-1,3-Dihydro-1-Methyl-3-Methylene-2H-1,4-benzodiazepin-2-One Diethyl 7-chloro-5(o-chlorophenyl-1-methyl)-1H-1,4-benzodiazepine-2(3H)-one-3-phosphonic acid (4.56 g., 0.01 mole) is dissolved in 25 ml. of 1,2-dimethoxyethane and slowly added to 0.421 g. (0.01 mole) of hexane washed 57 percent NaH in 10 ml. of 1,2-dimethoxyethane at 20°–25°, causing $H_2$ to be vigorously evolved. After 1¼ hours at 20°–30°, formaldehyde gas entrained in a stream of nitrogen, for pyrolysis of 0.9 g. (0.03 mole) paraformaldehyde at 190°, is passed just over the surface of the stirred Wittig reagent solution at 25°, causing a rapid discharge of the reagents color. After all of the formaldehyde is added, the solution is stirred 1 hour at room temperature, and then refluxed for ½ hour. The organic mixture is poured into 700 ml. $H_2O$, and the aqueous mixture is extracted four times with ether. The ether layer is washed with water, brine, and dried with $Na_2SO_4$. Evaporation of the ether gives 3.7 g. of a light yellow solid, m.p. 148°–152°. Crystallization from a small volume of $CH_3CN$ gives 1.9 g. of white crystals, m.p. 163°–164°.

| Analysis for: | $C_{17}H_{13}Cl_2N_2O$ |
|---|---|
| Calculated: | C, 61.64; H, 3.65; N, 3.46; Cl, 21.41 |
| Found: | C, 61.80; H, 3.69; N, 8.48; Cl, 21.37. |

EXAMPLE 5

7-Chloro-5-(o-Chlorophenyl)-1,3-Dihydro-3-Methylene-2H-1,4-Benzodiazepine-2-One Diethyl 7-chloro-5-(o-chlorophenyl)-1H-1,4-benzodiazepine-2(3H)-one-3-phosphonic acid (4.41 g., 0.01 mole) is dissolved in 75 ml. of 1,2-dimethoxyethane and slowly added to 0.85 g. (0.02 mole) of hexane washed 57 percent NaH in 10 ml. of 1,2-dimethoxyethane at 20°–25°. In a manner similar to example 4, gaseous formaldehyde, from pyrolysis of 1 g. paraformaldehyde at 190°, is passed over the surface of the 1,2-dimethoxyethane solution at 35°–40°. The resulting mixture is reacted and worked up in a manner similar to example 4, giving 3 g. of a yellow solid. Chromatography on silica gel, gives 1.5 g. of white crystals, m.p. 200°–202° dec. after crystallization from $CH_3CN$.

| Analysis for: | $C_{16}H_{10}Cl_2N_2O$ |
|---|---|
| Calculated: | C, 60.59; H, 3.18; N, 8.81; Cl, 22.35 |
| Found: | C, 60.65; H, 3.46; N, 9.20; Cl, 22.43. |

EXAMPLE 6

7-Chloro-5-(o-Chlorophenyl)-1-Methyl-1H-1,4-Benzodiazepine-2,3-Dione

Diethyl 7-chloro-5(o-chlorophenyl-1-methyl)-1H-1,4-benzodiazepine-2(3H-one-3-phosphonic acid (13.66 g., 0.30 mole) is dissolved in 75 ml. of hot 1,2-dimethoxyethane, and slowly added to 1.27 g. of hexane washed 57 percent NaH in 30 ml. of 1,2-dimethoxyethane at 20°–30°, causing $H_2$ to be vigorously evolved. After about 1 hour at 20°–30°, hydrogen ceases to be evolved, and oxygen gas is passed in through a sintered tube for about ½ hour, causing the color of the solution to be discharged to a brown color. The mixture is filtered through celite, and the filtrate is poured into 150 ml. water. Extraction of the aqueous mixture with ether causes 2.08 g. of a white solid to crystallize. Crystallization from ethyl acetate gives the title product, m.p. 204°–206°. The ether extract is washed with water, brine, and dried with magnesium sulfate, giving an additional 1.8 g. of product, m.p. 204°–207° after crystallization from 40 ml. of ethyl acetate-75 ml. hexane.

| Analysis for: | $C_{16}H_{10}Cl_2N_2O_2$ |
|---|---|
| Calculated: | C, 57.68; H, 3.03; N, 8.41; Cl, 21.28 |
| Found: | C, 57.56; H, 2.90; N, 8.22; Cl, 21.32. |

EXAMPLE 7

[3-Acetyl-7-Chloro-5-(o-Chlorophenyl)-2,3-Dihydro-2-Oxo-1H-1,4-Benzodiazepin-3-yl]Phosphonic Acid Diethyl Ester Diethyl 7-chloro-5-(o-chlorophenyl)-1H-1,4-benzodiazepine-2(3H)-one-3-phosphonic acid (13.66 g., 0.03 mole) is dissolved in 75 ml. of hot 1,2-dimethoxyethane, and slowly added to 1.27 g. of hexane washed 57 percent NaH in 30 ml. of 1,2-dimethoxyethane at 20°–30°, causing $H_2$ to be vigorously evolved. After about 1 hour at 20°–30°, 2.2 ml. (0.03 mole) of acetyl chloride is slowly added, and the solution is stirred for 2 hours at room temperature. The solution is then quickly brought to reflux, and then strip to dryness in vacuo. The solid is dissolved in a mixture of ethyl acetate-water, and the organic layer is washed with water, brine, and dried with magnesium sulfate. The solvent is evaporated to a small volume (25 ml.), causing 4.84 g. of crystals to form, m.p. 178°–180°. Crystallization from 25 ml. ethyl acetate-50 ml. hexane, gives 3.6 g. of white crystals, m.p. 186°–188°.

| Analysis for: | $C_{22}H_{23}Cl_2N_2O_4P$ |
|---|---|
| Calculated: | C, 53.13; H, 4.66; N, 5.63; Cl, 14.25 |
| Found: | C, 52.83; H, 4.57; N, 5.49; Cl, 14.18. |

EXAMPLE 8

7-Chloro-5-(o-Chlorophenyl)-1H-1,4-Benzodiazepine-2,3-Dione

Diethyl 7-chloro-5-(o-chlorophenyl)-1H-1,4-benzodiazepine-2(3H)-one-3-phosphonic acid (13.24 g., 0.030 mole) is dissolved in 60 ml. of DMF at 20°, and slowly added to a mixture of 2.54 g. of hexane washed 57 percent NaH in 20 ml. of DMF at 20°–30°, causing $H_2$ to be vigorously evolved. After about 1 hour at room temperature, the evolution of hydrogen had stopped. Oxygen gas is passed through a sintered glass tube at 20° for ½ hour, and the temperature is allowed to go to 25°–30°, and oxygen is passed in for an additional hour. Trimethylchlorosilane (3.8 ml., 0.03 mole) is added, and after 15 minutes the mixture is stripped in vacuo at 40°. Water and ethyl acetate are added, and the organic phase is washed with water, brine, and dried with MgSO₄. Evaporation of the ethyl acetate, gives 5.73 g. of crystals, m.p. 250° dec. Crystallization from acetonitrile, gives white crystals, m.p. 258° dec.

| Analysis for: | C₁₅H₈Cl₂N₂O₂ |
|---|---|
| Calculated: | C, 56.45; H, 2.52; N, 8.78; Cl, 22.22 |
| Found: | C, 56.55; H, 2.62; N, 9.15; Cl, 22.53. |

EXAMPLE 9

7-Chloro-5(o-Chlorophenyl)-3-Hydroxy-1H-1,4-benzodiazepine-2-One

7-Chloro-5-(o-chlorophenyl)-1H-1,4-benzodiazepine-2,3-dione (31.9 g., 0.1 mole) is stirred in 300 ml. methanol at 3°, and sodium borohydride (3.78 g., 0.1 mole) is added to the stirred mixture over ½ hour. The mixture is stirred for 2 hours, the methanol is removed on a rotary evaporator, and the residue is digested with ethyl acetate-water. The layers are separated, the organic layer washed with brine, dried with sodium sulfate, and evaporated giving the title compound.

EXAMPLE 10

7-Chloro-5-(o-Chlorophenyl)-3-Methyl-1H-1,4-Benzodiazepine-2-One

7-Chloro-5-(o-chlorophenyl)-1,3-dihydro-3-methylene-2H-1,4-benzodiazepine-2-one (31.7 g., 0.1 mole) is dissolved in 250 ml. absolute alcohol, 2 g. of 10 percent Pd/c is added and the mixture hydrogenated at 30 lbs/in² until one mole of hydrogen is taken up. The mixture is filtered, and the filtrate is evaporated, giving the title compound.

The subject matter which the applicants regard as their invention is particularly pointed out and distinctly claimed as follows:

1. A compound of the formula:

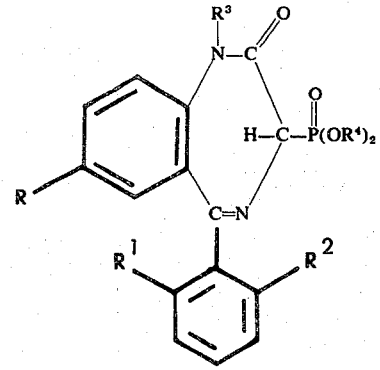

wherein R is hydrogen, lower alkyl, halo, -CF₃, or lower alkyl sulfonyl; $R^1$ is hydrogen, lower alkyl, halo, or lower alkylthio; $R^2$ is hydrogen, -CF₃, lower alkyl, halo, or lower alkyl sulfonyl; $R^3$ is hydrogen, or lower alkyl; $R^4$ is hydrogen, lower alkyl or phenyl(lower)alkyl.

2. A compound as defined in claim 1 which is diethyl 7-chloro-5-(o-chlorophenyl)-1H-1,4-benzodiazepine-2(3H)-one-3-phosphonic acid.

3. A compound as defined in claim 1 which is dimethyl 7-chloro-5-(o-chlorophenyl)-1H-1,4-benzodiazepine-2(3H)-one-3-phosphonic acid.

* * * * *